United States Patent
Liao

(10) Patent No.: US 9,969,337 B2
(45) Date of Patent: May 15, 2018

(54) METHODS AND SYSTEMS FOR MOBILE-AGENT NAVIGATION

(71) Applicant: Sharp Laboratories of America, Inc., Camas, WA (US)

(72) Inventor: Miao Liao, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 332 days.

(21) Appl. No.: 14/941,691

(22) Filed: Nov. 16, 2015

(65) Prior Publication Data

US 2016/0068114 A1 Mar. 10, 2016

Related U.S. Application Data

(60) Continuation-in-part of application No. 14/881,005, filed on Oct. 12, 2015, now Pat. No. 9,625,908, which is a division of application No. 14/476,574, filed on Sep. 3, 2014, now Pat. No. 9,157,757, application No.
(Continued)

(51) Int. Cl.
| | |
|---|---|
| *B60R 1/00* | (2006.01) |
| *B60R 11/04* | (2006.01) |
| *G06K 9/46* | (2006.01) |
| *G06T 7/20* | (2017.01) |
| *G06K 9/62* | (2006.01) |
| *G01C 21/20* | (2006.01) |
| *G05D 1/02* | (2006.01) |
| *G06T 7/73* | (2017.01) |

(52) U.S. Cl.
CPC .............. *B60R 11/04* (2013.01); *G01C 21/20* (2013.01); *G05D 1/0253* (2013.01); *G06K 9/4604* (2013.01); *G06K 9/6201* (2013.01); *G06T 7/20* (2013.01); *G06T 7/73* (2017.01)

(58) Field of Classification Search
None
See application file for complete search history.

(56) References Cited

U.S. PATENT DOCUMENTS

| | | | |
|---|---|---|---|
| 7,340,076 B2* | 3/2008 | Stach | G06T 1/0021 382/100 |
| 8,022,812 B2* | 9/2011 | Beniyama | G05D 1/024 235/375 |

(Continued)

*Primary Examiner* — Jonathan M Dager
(74) *Attorney, Agent, or Firm* — ScienBiziP, P.C.; Steve Reiss

(57) ABSTRACT

Feature detection may be performed on an image. After feature descriptors for each detected feature are computed, feature matching between feature descriptors for the current image and for a key image frame is performed. If a sufficient number of good matches are identified, key points associated with the feature correspondences may be projected from image coordinates to world coordinates. A distance, in the world coordinate frame, between each feature correspondence may he computed. When the computed distances indicate sufficient movement of the mobile agent to ensure accurate motion estimation, a motion estimate may he computed from the pairs of world coordinates associated with the feature correspondences. A current camera pose in a global coordinate frame may be generated. A motion trajectory may then be determined and feature descriptors for the key image may be updated to the feature descriptors for the current image frame.

20 Claims, 9 Drawing Sheets

Related U.S. Application Data

14/941,691, which is a continuation-in-part of application No. 14/476,524, filed on Sep. 3, 2014.

(56) References Cited

U.S. PATENT DOCUMENTS

| | | | | |
|---|---|---|---|---|
| 8,174,568 B2* | 5/2012 | Samarasekera | ...... | G01C 21/005 348/113 |
| 8,238,612 B2* | 8/2012 | Susca | ...... | G06T 7/246 348/154 |
| 8,340,901 B2* | 12/2012 | Fahn | ...... | G05D 1/0246 348/142 |
| 8,447,863 B1* | 5/2013 | Francis, Jr. | ...... | H04W 4/02 709/226 |
| 8,661,605 B2* | 3/2014 | Svendsen | ...... | A47L 5/30 15/319 |
| 8,663,130 B2* | 3/2014 | Neubach | ...... | A61B 8/485 600/407 |
| 8,705,842 B2* | 4/2014 | Lee | ...... | G05D 1/0274 382/153 |
| 8,825,387 B2* | 9/2014 | Mays | ...... | G01C 21/20 701/433 |
| 8,918,241 B2* | 12/2014 | Chen | ...... | G05D 1/0219 318/568.12 |
| 8,929,604 B2* | 1/2015 | Platonov | ...... | G01C 21/3602 382/104 |
| 8,937,410 B2* | 1/2015 | Comins | ...... | B25J 19/063 307/326 |
| 9,223,312 B2* | 12/2015 | Goel | ...... | G05D 1/0268 |
| 2004/0167667 A1* | 8/2004 | Goncalves | ...... | G01C 21/12 700/245 |
| 2006/0055530 A1* | 3/2006 | Wang | ...... | G01S 5/0018 340/539.13 |
| 2006/0056707 A1* | 3/2006 | Suomela | ...... | G06K 7/10712 382/232 |
| 2006/0058921 A1* | 3/2006 | Okamoto | ...... | G05D 1/0214 700/255 |
| 2007/0027579 A1* | 2/2007 | Suzuki | ...... | G05D 1/0251 700/245 |
| 2007/0061041 A1* | 3/2007 | Zweig | ...... | G05D 1/0261 700/245 |
| 2007/0100498 A1* | 5/2007 | Matsumoto | ...... | G05D 1/024 700/245 |
| 2007/0188328 A1* | 8/2007 | Mochizuki | ...... | G06K 7/0008 340/572.7 |
| 2007/0242900 A1* | 10/2007 | Chen | ...... | G06T 5/50 382/294 |
| 2007/0271003 A1* | 11/2007 | Bang | ...... | G05D 1/0272 700/245 |
| 2008/0077511 A1* | 3/2008 | Zimmerman | ...... | G06Q 10/00 705/28 |
| 2008/0094472 A1* | 4/2008 | Ayer | ...... | A63B 24/0003 348/157 |
| 2009/0012667 A1* | 1/2009 | Matsumoto | ...... | G05D 1/0251 701/26 |
| 2009/0074545 A1* | 3/2009 | Lert, Jr. | ...... | B65G 1/0492 414/276 |
| 2009/0207257 A1* | 8/2009 | Jung | ...... | G06T 7/73 348/208.1 |
| 2010/0076631 A1* | 3/2010 | Mian | ...... | G05D 1/0229 701/19 |
| 2010/0152944 A1* | 6/2010 | Kouno | ...... | G05D 1/024 701/26 |
| 2010/0155156 A1* | 6/2010 | Finkelstein | ...... | B25J 5/007 180/54.1 |
| 2010/0235032 A1* | 9/2010 | Sung | ...... | G05D 1/0246 701/25 |
| 2011/0106312 A1* | 5/2011 | Chen | ...... | B25J 9/1697 700/259 |
| 2012/0050474 A1* | 3/2012 | Segall | ...... | G06T 5/50 348/43 |
| 2012/0121161 A1* | 5/2012 | Eade | ...... | G09B 29/007 382/153 |
| 2013/0231779 A1* | 9/2013 | Purkayastha | ...... | B25J 9/1697 700/259 |
| 2015/0127247 A1* | 5/2015 | Xu | ...... | G01C 21/30 701/411 |
| 2016/0063330 A1* | 3/2016 | Xu | ...... | G06T 7/73 382/103 |
| 2016/0271795 A1* | 9/2016 | Vicenti | ...... | B25J 9/163 |
| 2016/0292883 A1* | 10/2016 | Comport | ...... | G06T 7/204 |
| 2016/0327383 A1* | 11/2016 | Becker | ...... | G01B 11/005 |

* cited by examiner

METHODS AND SYSTEMS FOR MOBILE-AGENT NAVIGATION

CROSS REFERENCE TO RELATED APPLICATIONS

This application is a continuation-in-part of U.S. patent application Ser. No. 14/881,005, entitled "Methods and Systems for Mobile-Agent Navigation," filed Oct. 12, 2015, invented by Miao Liao, Xinyu Xu and Petrus J. L. van Beek; and is also a continuation-in-part of U.S. patent application Ser. No. 14/476,524, entitled "Methods and Systems for Vision-Based Motion Estimation," filed Sep. 3, 2014, invented by Xinyu Xu, Miao Liao and Petrus J. L. van Beek; said application U.S. patent application Ser. No. 14/881,005 is a division of U.S. patent application Ser. No. 14/476,574, entitled "Methods and Systems for Mobile-Agent Navigation," filed Sep. 3, 2014, invented by Miao Liao, Xinyu Xu and Petrus J. L. van Beek, now U.S. Pat. No. 9,157,757, issued Oct. 13, 2015; said applications, U.S. patent application Ser. No. 14/881,005, U.S. patent application Ser. No. 14/476,574 and U.S. patent application Ser. No. 14/476,524, are hereby incorporated by reference herein, in their entirety.

FIELD OF THE INVENTION

Embodiments of the present invention relate generally to methods and systems for autonomous navigation and, in particular, to methods and systems for accurate and long range autonomous navigation.

BACKGROUND

Accurate estimation of the ego-motion of a mobile agent, for example, a vehicle, a human, a robot and other mobile agents, relative to a surface path on which the mobile agent is traveling may be a key component for autonomous driving and computer-vision-based driving assistance. The use of one or more cameras, as opposed to other sensors, for computing ego-motion may allow for the integration of ego-motion data into other vision-based algorithms, for example, obstacle detection and/or avoidance, pedestrian detection and/or avoidance, object detection and/or avoidance and other vision-based algorithms, without necessitating calibration between sensors. This may reduce maintenance requirements and cost. The process of estimating the ego-motion of a mobile agent using only input from one or more cameras attached to the mobile agent is referred to as Visual Odometry (VO).

In VO, the pose of a mobile agent is incrementally estimated via examination of changes that the motion of the mobile agent induces on the images obtained by the one or more onboard cameras. For VO to work effectively, sufficient illumination in the environment and a static scene with sufficient texture to allow apparent motion to be extracted may be required. Additionally, temporally consecutive frames should be captured to ensure sufficient scene overlap.

One advantage to VO for providing a motion estimate is that VO is not affected by wheel slip in uneven terrain and other adverse conditions. Furthermore, VO may provide important supplemental information to other motion-estimation processes and systems, for example, Global Positioning System (GPS), Inertial Measurement Units (IMUs), laser odometry and other systems providing motion estimation. Additionally, in GPS-denied environments, for example, underwater, aerial and other environments wherein GPS may be denied, and environments wherein GPS information is not reliable, for example, due to multipath, poor satellite coverage and other reliability factors, VO may have increased importance.

Many motion-estimation algorithms for estimating motion using exclusively video input assume static scenes. Additionally, many motion-estimation algorithms for estimating motion using exclusively video input cannot cope with dynamic and/or cluttered environments or large occlusions generated by passing vehicles and other objects. Furthermore, feature matching and outlier removal in motion estimation may not be robust and may subsequently fail. Many motion-estimation schemes require a significant number of key points and may fail when a limited number of key points are available in scenes absent of structure.

Real-time VO methods and systems that do not rely on the above-listed assumptions and overcome the above-listed limitations may be desirable.

SUMMARY

Some embodiments of the present invention may comprise methods and systems for using a camera for estimating ego-motion.

According to a first aspect of the present invention, a precisely calibrated camera may be rigidly mounted, on a mobile agent, with respect to the mobile agent and a ground plane. The parameterization of the motion of the mobile agent at any time instant may be simplified from six degrees of freedom to three degrees of freedom by assuming the mobile agent travels over a predominantly planar ground plane, thereby maintaining a fixed camera-to-ground relationship at each time instant during mobile-agent travel.

According to a second aspect of the present invention, a current image frame may be received from the camera. According to a third aspect of the present invention, feature detection may be performed on the current image frame. According to a fourth aspect of the present invention, a feature descriptor for each of the detected features may be computed. According to a fifth aspect of the present invention, feature matching between the computed feature descriptors for the current image frame and feature descriptors computed for a key image frame may be performed. According to a sixth aspect of the present invention, if a sufficient number of good matches are identified, key points associated with the feature correspondences may be projected from image coordinates to world coordinates. According to a seventh aspect of the present invention, a distance, in the world coordinate frame, between each feature correspondence may be computed. When the computed distances indicate sufficient movement of the mobile agent to ensure accurate motion estimation, a motion estimate may be computed from the pairs of world coordinates associated with the feature correspondences. According to an eighth aspect of the present invention, a current camera pose in a global coordinate frame may be generated. According to a ninth aspect of the present invention, a motion trajectory may be determined from the current camera pose. According to a tenth aspect of the present invention, the key image frame may be updated to the current image frame, and the feature descriptors computed for the key image may be updated to the feature descriptors computed for the current image frame.

Some embodiments of the present invention may comprise methods and systems for adding a waypoint to an ordered plurality of waypoints, wherein the ordered plurality of waypoints describe a path between a starting location and an ending location.

According to an eleventh aspect of the present invention, a new waypoint may be received. According to a twelfth aspect of the present invention, the new waypoint may be added at the terminal end of the plurality of waypoints. According to a thirteenth aspect of the present invention, if a mobile agent is stopped, a target waypoint may be updated to the new waypoint, and the mobile agent may drive toward the target waypoint.

Some embodiments of the present invention may comprise methods and systems for optimization of a plurality of camera parameters. According to a fourteenth aspect of the present invention, a plurality of camera parameter values may be received. According to a fifteenth aspect of the present invention, a mobile agent may be caused to traverse a known path from a known starting point to a known ending point. According to a sixteenth aspect of the present invention, a plurality of image frames may be recorded while the mobile agent traverses the known path. According to a seventeenth aspect of the present invention, an endpoint of the mobile agent may be estimated using the plurality of image frames and the plurality of camera parameter values. According to an eighteenth aspect of the present invention, when the difference between the known ending point and the estimated endpoint is not sufficiently small, the camera parameters may be optimized. According to a nineteenth aspect of the present invention, the plurality of camera parameter values may be replaced by the plurality of optimized camera parameter values.

Some embodiments of the present invention may comprise methods and systems for correcting drift in a VO method. According to a twentieth aspect of the present invention, a current heading and a current position of a mobile agent may be computed. According to a twenty-first aspect of the present invention, if the mobile agent is close to a target waypoint and a machine-readable code is associated with the target waypoint, then the speed of the mobile agent may be reduced, and the machine-readable code may be identified. According to a twenty-second aspect of the present invention, a position of the mobile agent relative to the machine-readable code may be computed. According to a twenty-third aspect of the present invention, an actual position and an actual heading of the mobile agent may be determined based on the position of the mobile agent relative to the machine-readable code. According to a twenty-fourth aspect of the present invention, the current position may be updated to the actual position and the current heading may be updated to the actual heading.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1A, FIG. 1B and FIG. 1C are a chart showing exemplary embodiments of the present invention comprising performing feature detection on a current image frame, computing a feature descriptor for each of the detected features, performing feature matching between the computed feature descriptors for the current image frame and feature descriptors previously computed for a key image frame, when there are sufficient number of matches, projecting the key points associated with the feature correspondences from image coordinates to world coordinates, when there is sufficient movement between the current image frame and the key image frame, computing a motion estimate from the pairs of world coordinates associated with the feature correspondences, generating a current camera pose in a global coordinate frame, determining a motion trajectory from the current camera pose and updating the key-image-frame feature descriptors to the feature descriptors computed for the current image frame;

DETAILED DESCRIPTION OF THE EXEMPLARY EMBODIMENTS

Figure 1A:
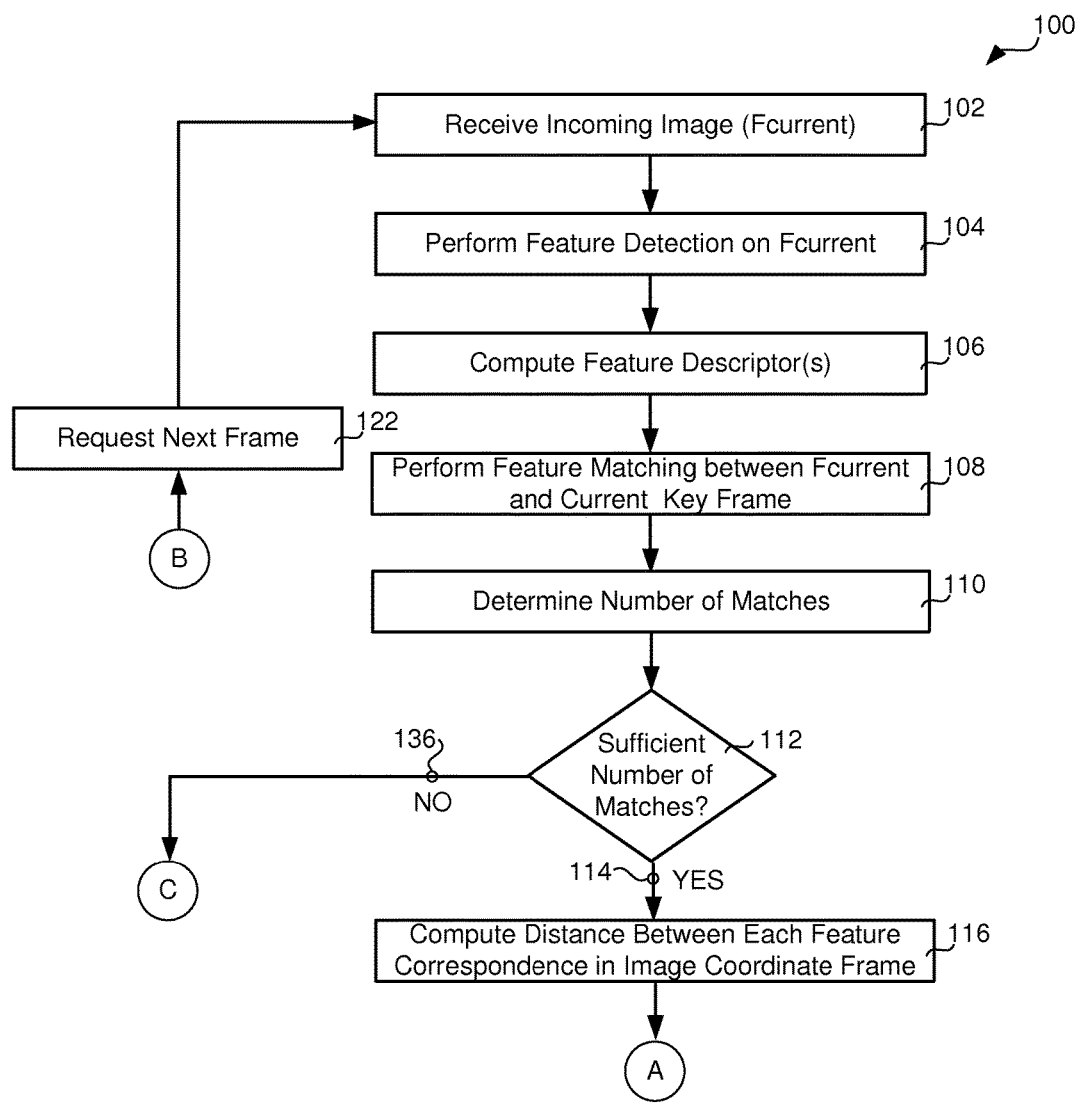

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Accurate estimation of the ego-motion of a mobile agent, for example, a vehicle, a human, a robot and other mobile agents, relative to a surface path on which the mobile agent is traveling may be a key component for autonomous driving and computer-vision-based driving assistance. The use of one or more cameras, as opposed to other sensors, for computing ego-motion may allow for the integration of ego-motion data into other vision-based algorithms, for example, obstacle detection and/or avoidance, pedestrian detection and/or avoidance, object detection and/or avoidance and other vision-based algorithms, without necessitating calibration between sensors. This may reduce maintenance requirements and cost. The process of estimating the ego-motion of a mobile agent using only input from one or more cameras attached to the mobile agent is referred to as Visual Odometry (VO).

In VO, the pose of a mobile agent is incrementally estimated via examination of changes that the motion of the mobile agent induces on the images obtained by the one or more onboard cameras. For VO to work effectively, sufficient illumination in the environment and a static scene with sufficient texture to allow apparent motion to be extracted may be required. Additionally, temporally consecutive frames should be captured to ensure sufficient scene overlap.

One advantage to VO for providing a motion estimate is that VO is not affected by wheel slip in uneven terrain and other adverse conditions. Furthermore, VO may provide important supplemental information to other motion-estimation processes and systems, for example, Global Positioning System (GPS), Inertial Measurement Units (IMUs), laser odometry and other systems providing motion estimation. Additionally, in GPS-denied environments, for example, underwater, aerial and other environments wherein GPS may be denied, and environments wherein GPS information is not reliable, for example, due to multipath, poor satellite coverage and other reliability factors, VO may have increased importance.

Many motion-estimation algorithms for estimating motion using exclusively video input assume static scenes. Additionally, many motion-estimation algorithms for estimating motion using exclusively video input cannot cope with dynamic and/or cluttered environments or large occlusions generated by passing vehicles and other objects. Furthermore, feature matching and outlier removal in motion estimation may not be robust and may subsequently fail. Many motion-estimation schemes require a significant number of key points and may fail when a limited number of key points are available in scenes absent of structure.

Real-time VO methods and systems that do not rely on the above-listed assumptions and overcome the above-listed limitations may be desirable.

Figure 1B:
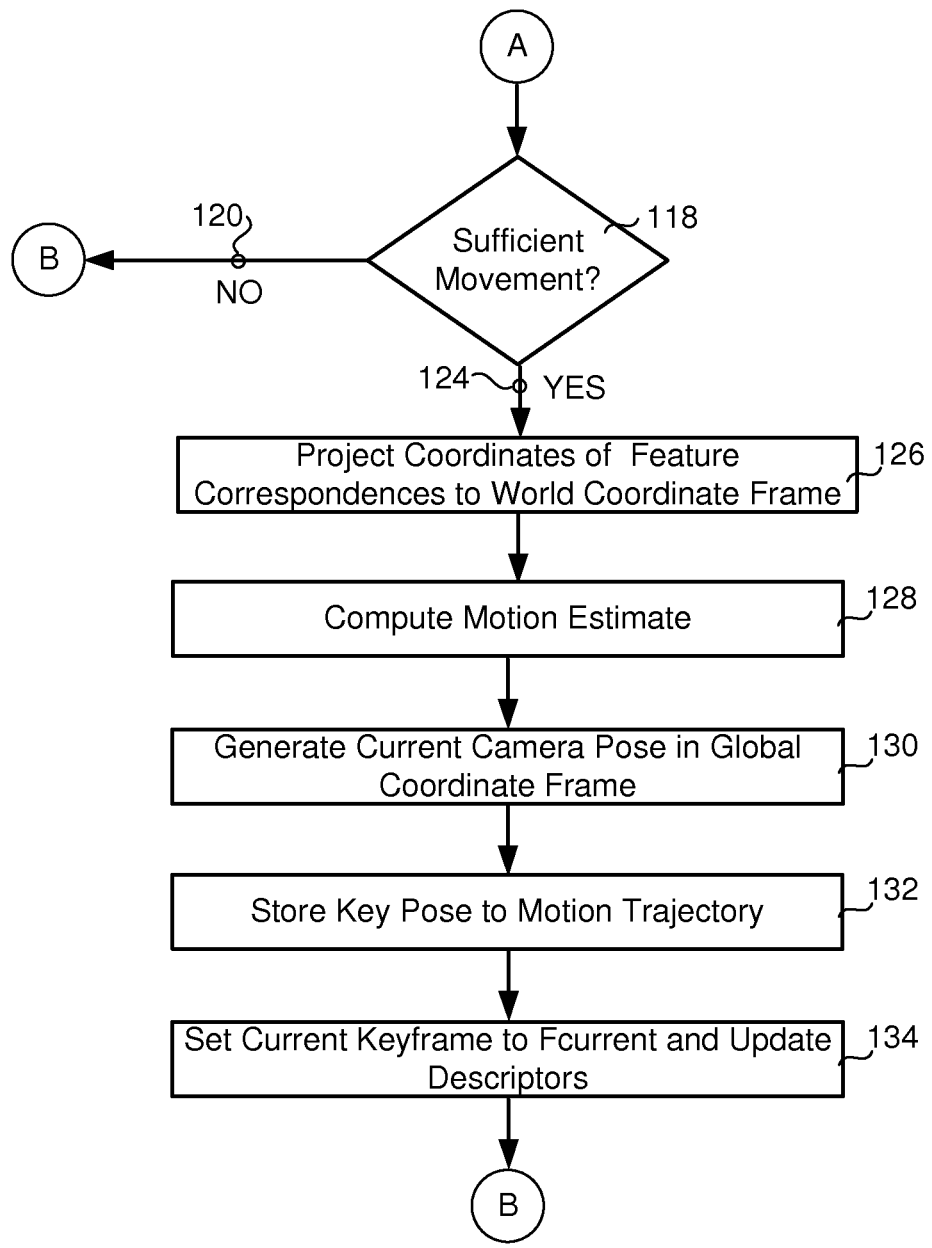
Figure 1C:
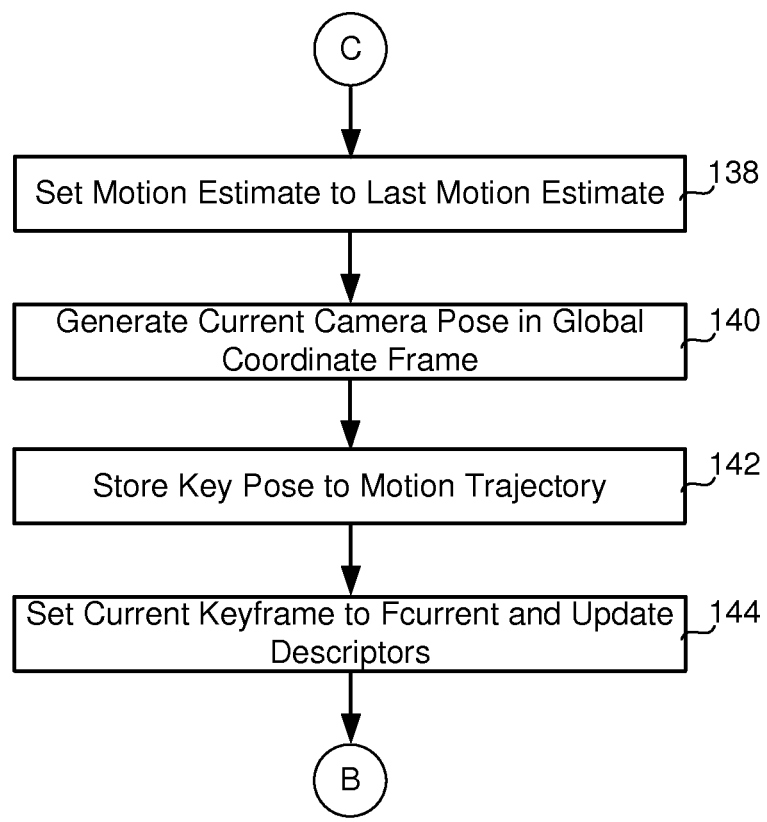

Some embodiments of the present invention described in relation to FIGS. 1A, 1B and 1C may comprise a method 100 for Visual Odometry (VO). An incoming image, also referred to as an incoming image frame, an incoming frame, a current image, a current image frame and a current frame, denoted Fcurrent, may be received 102 in a processor component. In some embodiments of the present invention, the incoming image may be received directly from an image-acquisition component. In alternative embodiments, the incoming image may be received indirectly from an image-acquisition component. In some embodiments of the present invention, the image-acquisition component and the processor component may both reside in a camera rigidly attached to a mobile agent. In alternative embodiments of the present invention, the image-acquisition component may reside within a camera rigidly attached to a mobile agent, whereas, the processor component may be onboard the mobile agent, but not integrated with the rigidly attached camera. In some embodiments of the present invention, the incoming image may be a color image. In alternative embodiments of the present invention, the incoming image may be a gray-scale image. In some embodiments of the present invention, the incoming image may be a gray-scale image generated from an acquired color image. In some of these embodiments, the incoming gray-scale image may be generated within an image-acquisition component. In alternative of these embodiments, the incoming gray-scale image may be generated, from an acquired color image, outside of an image-acquisition component.

Feature detection may be performed 104, on the current image, to identify one or more regions, in the current image, that exhibit a significantly strong variation of intensity, for example, an edge, a corner, a blob, a peak and other spatial feature exhibiting a significantly strong variation in intensity. The center, or substantially the center, of each of the one or more identified regions may be designated as a key point, thereby producing one or more key points associated with the current image.

Performing feature detection may comprise applying one or more key-point feature detectors known in the art, for example, a corner detector, a blob detector, a peak detector, a Scale-Invariant Feature Transform (SIFT) key-point detector, a Speeded Up Robust Features (SURF) key-point detector, a Features from Accelerated Segment Test (FAST) key-point detector, an Oriented FAST and Rotated BRIEF (ORB) key-point detector, a Maximally Stable Extremal Regions (MSER) key-point detector, a Binary Robust Independent Elementary Features (BRIEF) key-point detector, a Binary Robust Invariant Scalable Keypoints (BRISK) key-point detector, a Fast REtinA Keypoint (FREAK) key-point detector, a STAR key-point detector and other key-point feature detectors, to the current image. In some embodiments of the present invention, a FAST key-point detector may be used due to its fast detection speed that makes it suitable for real-time autonomous navigation applications.

In some embodiments of the present invention, a grid-based FAST feature detector may be used to perform feature detection 104. In these embodiments, the current image may be divided into an m×n grid. In some embodiments of the present invention, m and n may be distinct values. In alternative embodiments, the value of m and the value of n may be the same. The FAST key-point detector may be applied to each grid element. In some embodiments of the present invention, a max-key-point-count threshold on the maximum count of key points detected in an image may be specified. The value of the max-key-point-count threshold may be used to adjust the processing speed for each incoming image. In some embodiments of the present invention, the number of grid elements may be selected based on a desired processing speed for an incoming image.

A feature descriptor to characterize the region around each designated key point may be computed 106. In some embodiments of the present invention, the feature descriptor associated with a region may be the appearance, for example, the pixel intensity or color values, of the region. In some embodiments of the present invention, the feature descriptor associated with a region may be based on the appearance of the region, for example, the raw pixel values may be normalized by the mean of the pixel values, the energy of the pixel values or some other statistic computed from the raw pixel values. In alternative embodiments, the raw pixel values may be adjusted by the mean of the pixel values, for example, the mean pixel value may be subtracted from the raw pixel values. In some embodiments of the present invention, the feature descriptor may be the spatial gradient across the region. In some embodiments of the present invention, the feature descriptor associated with a region may be robust to one or more of a viewpoint change, a rotation and a scale change. Exemplary descriptors include a SIFT feature descriptor, a SURF feature descriptor, an ORB feature descriptor, a BRIEF feature descriptor, a BRISK feature descriptor, a FREAK feature descriptor and other viewpoint-invariant, rotation-invariant or scale-invariant feature descriptors. In some embodiments of the present invention, the feature descriptor may be a compact feature descriptor. The above-listed feature descriptors are intended for purpose of illustration and not limitation.

Feature matching between the feature descriptors computed from the current image frame and those computed previously from a current key frame may be performed 108. The current key frame may be initialized to the first received, incoming image frame. Each key point in the current image frame may be associated with a key point from the current key frame, thereby producing a plurality of feature correspondences, wherein each feature correspondence associates a key point in the current image frame with a key point in the current key frame.

In some embodiments of the present invention, each feature descriptor computed for the current image frame may be exhaustively compared to each feature descriptor computed for the current key frame. Comparison of a current-image-frame feature descriptor with a current-key-frame feature descriptor may comprise computing a similarity measure. In some embodiments of the present invention wherein the feature descriptor is the feature appearance, the similarity measure may be the sum of squared differences. In alternative embodiments of the present invention wherein the feature descriptor is the feature appearance, the similarity measure may be the normalized cross correlation.

In some embodiments of the present invention, performing feature matching 108 may comprise a fast, nearest-neighbor search with a k-dimensional tree. In some embodiments of the present invention, wherein the feature descriptor is a binary descriptor such as the BRIEF descriptor, similarity may be measured using the Hamming distance. In alternative embodiments, wherein other non-binary feature descriptors may be used, a mathematical norm, for example, the L2 norm, the L1 norm and other metrics defined by a norm, may be used for the similarity measure. In alternative embodiments, feature matching 108 may be performed using a bitwise comparison of two feature descriptor values.

In some embodiments of the present invention, the feature matches may be pruned to retain only sufficiently good matches for computing a motion transformation. In some embodiments of the present invention, a distance-ratio test between the top two matches may be performed. The ratio between the closest and the second closest match may be computed. If the ratio is smaller than a user-specified threshold, then the closest match may be accepted. In some embodiments of the present invention, the user-specified threshold may be equal to 0.65. After performing matching with the distance-ratio test, a mutual-consistency check may be performed to eliminate features in the current image frame that match more than one feature in the current key frame image. The mutual-consistency check eliminates all matches that are not mutually preferred.

A number of accepted feature matches may be determined 110. A determination 112 may be made of the sufficiency of the number of matches. In some embodiments of the present invention, the determination of the sufficiency of the number of matches may comprise comparing the number of inlier matches to a preset threshold.

Figure 2:
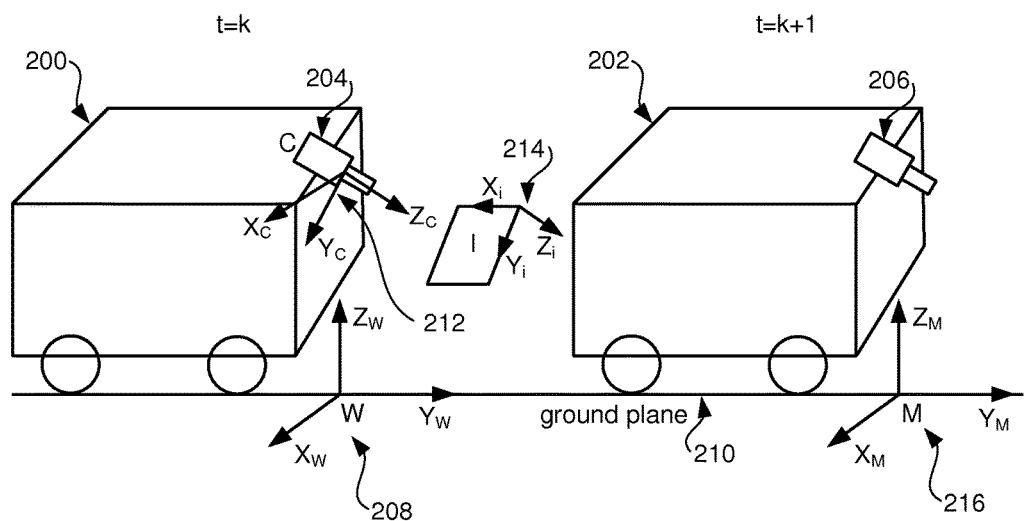
FIG. 2 is a picture illustrating a plurality of coordinate frames related to embodiments of the present invention.

FIG. 2 illustrates a plurality of coordinate frames related to embodiments of the present invention. FIG. 2 depicts a mobile agent 200, 202, with a single, onboard, rigidly mounted camera 204, 206, at two time instants, t=k and t=k+1, respectively. A global world coordinate frame 208, with coordinate axes denoted $X_W$, $Y_W$ and $Z_W$, may be denoted W. The global world coordinate frame 208, W, is stationary when the mobile agent 200, 202 is traveling along a planar ground plane 210 path. The planar ground plane 210 may be assumed to lie in the Z=0 plane. The origin of the global world coordinate frame 208, W, is a starting position of the path. The camera coordinate frame 212 may be denoted C, with coordinate axes denoted $X_C$, $Y_C$ and $Z_C$, the image coordinate frame 214 may be denoted I, with coordinate axes denoted $X_I$, $Y_I$ and $Z_I$, and the mobile-agent coordinate frame 216 may be denoted M, with coordinate axes denoted $X_M$, $Y_M$ and $Z_M$. The mobile-agent coordinate frame 216 may also be referred to as the world coordinate frame. Both the camera coordinate frame 212, C, and the mobile-agent coordinate frame 216, M, may move with the movement of the mobile agent 200, 202.

Since the camera 204, 206 is rigidly mounted on the mobile agent 200, 202, the camera coordinate frame 212, C, has a fixed relationship with the mobile-agent coordinate frame 216, M. A coordinate vector $XX_M$, in the mobile-agent coordinate frame 216, M, corresponding to a point, which may be denoted P, may be related to the coordinate vector, $XX_C$, of the point, P, in the camera coordinate frame 212, C, according to:

$$XX_C = R_C * XX_M + t_C,$$

where $R_C$ may denote a rotation matrix from the mobile-agent coordinate frame 216, M, to the camera coordinate frame 212, C, and $t_C$ may denote a translation vector that is the coordinate vector of the origin of the mobile-agent coordinate frame 216, M, in the camera coordinate frame 212, C. $R_C$ and $t_C$ are extrinsic camera parameters and may be obtained with camera calibration. The point P may be projected on to the image plane by the camera. Denoting the projected image point as p with image coordinate frame coordinate vector $XX_I$, the camera coordinate vector $XX_C$ may be related to $XX_I$ according to:

$$l * XX_I = K * XX_C,$$

where K may denote the camera intrinsic matrix and l may denote a scale factor representing a loss of depth due to projection from three-dimensions to two-dimensions.

The intrinsic and extrinsic camera parameters may be estimated by techniques well-known in the art.

In some embodiments of the present invention, the intrinsic parameters may be obtained and stored permanently in the mobile agent. In some embodiments of the present invention, re-calibration of the extrinsic camera parameters may be performed while the mobile agent is in operation. A calibration pattern on the ground may be captured. The corner points from the image of the calibration pattern may be extracted, and the extrinsic camera parameters may be computed. These newly computed extrinsic camera parameters and the stored intrinsic camera parameters may be used to update the camera parameters when re-calibration is required.

For a key point on the image at image coordinates denoted $[x, y]^T$, a corresponding point in the mobile-agent coordinate frame, also referred to as the world coordinate frame, may be computed according to:

$$l \begin{bmatrix} x \\ y \\ 1 \end{bmatrix} = K[\, R_c \quad t_c \,] \begin{bmatrix} X \\ Y \\ Z \\ 1 \end{bmatrix},$$

where K may denote the camera intrinsic parameters, $R_C$ and $t_C$ may denote the camera extrinsic parameters, $[X, Y, Z]^T$ may denote the coordinates in the mobile-agent coordinate frame and l may denote an unknown scale factor of the coordinate in the mobile-agent coordinate frame. Therefore, the mobile-agent coordinates may be computed according to:

$$\begin{bmatrix} X \\ Y \\ Z \end{bmatrix} = R_c^{-1} \left( lK^{-1} \begin{bmatrix} x \\ y \\ 1 \end{bmatrix} - t_c \right).$$

Assuming that the mobile agent travels predominantly on a ground plane and that the camera only looks at the ground plane, the coordinate of the key point in the world coordinate frame must satisfy the ground plane equation. The general form of any plane may be expressed as:

$$aX+bY+cZ+d=0$$

and may be written:

$$[\, a \quad b \quad c \,] \begin{bmatrix} X \\ Y \\ Z \end{bmatrix} + d = 0.$$

Hence:

$$[\, a \quad b \quad c \,] R_c^{-1} \left( lK^{-1} \begin{bmatrix} x \\ y \\ 1 \end{bmatrix} - t_c \right) + d = 0$$

and $$l[\, a \quad b \quad c \,] R_c^{-1} K^{-1} \begin{bmatrix} x \\ y \\ 1 \end{bmatrix} = [\, a \quad b \quad c \,] R_c^{-1} t_c - d.$$

Assuming that the ground lies on the Z=0 plane, then d=0, the normal vector of the ground plane $[a \ b \ c]^T = [0 \ 0 \ 1]^T$ and all variables in the equation above are known. Therefore, a value for l may be computed for each coordinate of the key point, and the mobile-agent coordinates may be computed using the computed l value.

Referring again to FIG. 1A, if it is determined that there are 114 a sufficient number of matches, then a distance, in the image coordinate frame, between each pair of feature correspondences may be computed 116. A determination 118 may be made of the sufficiency of the amount of movement between the current image frame and the current key frame. If it is determined 120 that there is insufficient movement between the current image frame and the current key frame, then the next, incoming image frame may be requested 122.

If it is determined 124 that there is sufficient movement between the current image frame and the current key frame, then the coordinates of the key points associated with each feature-correspondence pair may be projected 126 from an image coordinate frame to a world coordinate frame, also referred to as the mobile-agent coordinate frame.

Then a motion estimate may be computed 128 using the world coordinates of the key points for the feature-correspondence pairs. The motion estimate may comprise an optimal, rigid transformation, which may be denoted $T_{k,k-1}$, that may align the three-dimensional coordinates of each key point associated with a feature-correspondence point in the current key frame with the three-dimensional coordinates of its corresponding key point in the current image frame.

Denoting the set of three-dimensional coordinates of the key points associated with a feature-correspondence point in the current key frame as A and the set of three-dimensional coordinates of the corresponding key points in the current image frame as B, the relation between A and B may be written:

$$B = T_{k,k-1} A,$$

where $T_{k,k-1}$ may denote the transformation between the current image frame and the current key frame. Since the camera motion is rigid motion, the transformation, $T_{k,k-1}$, may consist of a rigid rotation between a time, previous time, corresponding to the acquisition of the current key frame and a time, current time, corresponding to the acquisition of the current image frame, which may be denoted $R_{k,k-1}$, and a translation between the previous time and the current time, which may be denoted $t_{k,k-1}$. Therefore, $$B = T_{k,k-1} A = \begin{bmatrix} R_{k,k-1} & t_{k,k-1} \\ 0 & 1 \end{bmatrix} A = R_{k,k-1} A + t_{k,k-1}.$$

Figure 3:
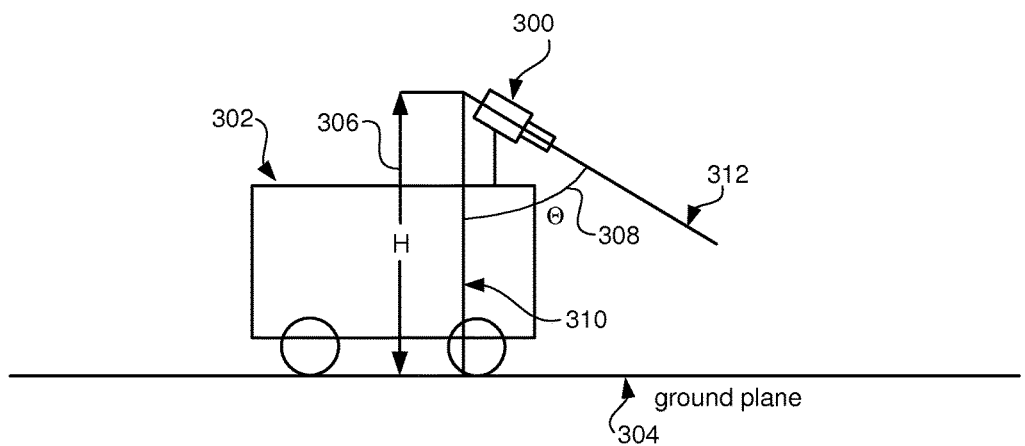
FIG. 3 is a picture illustrating an exemplary camera configuration on a mobile-agent platform according to exemplary embodiments of the present invention.

In some embodiments of the present invention, a camera configuration on a mobile-agent platform may be described in relation to FIG. 3. A precisely calibrated camera 300 may be rigidly mounted with respect to a mobile agent 302 and a ground plane 304. In some embodiments of the present invention, the camera 300 may be mounted on the front of the mobile agent 302 above the body chassis. The camera 300 may be tilted toward the ground to provide a good view of the ground directly in front of the mobile agent 302. In alternative embodiments of the present invention (not shown), the camera may be mounted on the back end of the mobile agent above the body chassis. The camera may be tilted toward the ground to provide a good view of the ground directly behind the mobile agent.

The height 306, which may be denoted H, above the ground plane 304 and the angle 308, which may be denoted Θ, between the normal 310 to the ground plane 304 and the camera 300 line-of-sight 312 may be assumed to be constant. Additionally, it may be assumed that the angle, Θ, 308 may not be subject to large vibrations as the mobile agent 302 moves across the ground. The extrinsic camera parameters with respect to the ground characterize the values H and Θ and the rotation and translation of the camera coordinate frame from the mobile-agent coordinate frame.

Further assuming that the mobile-agent 302 travels over a predominantly planar ground plane 304, the assumption that a fixed camera-to-ground relationship holds at each time instant during mobile-agent travel remains valid.

The above-described assumptions allow the simplification of the parameterization of the motion of the mobile agent at any time instant from six degrees of freedom to three degrees of freedom: a translation in x and y, which may be denoted $[x_{k,k-1}, y_{k,k-1}]$, and a rotation, which may be denoted $\theta_{k,k-1}$, all with respect to the global world coordinate frame. Thus, with inter-frame transformation, $T_{k,k-1}$, may be written:

$$T_{k,k-1} = \begin{bmatrix} R_{k,k-1} & t_{k,k-1} \\ 0 & 1 \end{bmatrix} = \begin{bmatrix} \cos(-\theta_{k,k-1}) & -\sin(-\theta_{k,k-1}) & -x_{k,k-1} \\ \sin(-\theta_{k,k-1}) & \cos(-\theta_{k,k-1}) & -y_{k,k-1} \\ 0 & 0 & 1 \end{bmatrix}.$$

Figure 4:
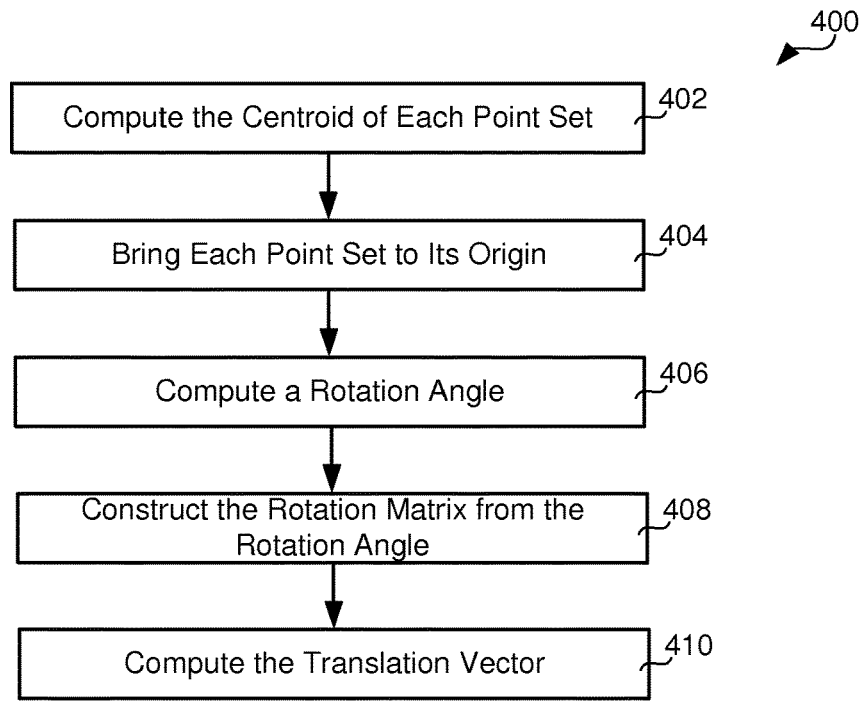
FIG. 4 is a chart showing exemplary embodiments of the present invention comprising Absolute-Orientation-based (AO-based) motion estimation.

Some embodiments comprising an Absolute-Orientation-based method 400 for estimation of the rigid rotation, $R_{k,k-1}$, and the translation, $t_{k,k-1}$, may be described in relation to FIG. 4. In these exemplary embodiments, the rigid rotation, $R_{k,k-1}$, and the translation, $t_{k,k-1}$, may be estimated by minimizing the mean-squared-error (MSE), which may be denoted E, between the centralized points corresponding to the paired points in A and B according to:

$$E = \frac{1}{n} \sum_{i=1:n} \|B_i' - R_{k,k-1} A_i' - t_{k,k-1}\|,$$

where n may denote the number of feature correspondence pairs, and $A_i'$ and $B_i'$ may denote the centralized points computed according to:

$$\bar{B} = \frac{1}{n} \sum_{i=1:n} B_i \quad \bar{A} = \frac{1}{n} \sum_{i=1:n} A_i$$
$$B_i' = B_i - \bar{B} \quad A_i' = A_i - \bar{A}.$$

In these exemplary embodiments, a centroid may be computed 402 for each point set A and B according to:

$$\bar{A} = \frac{1}{n} \sum_{i=1:n} A_i \quad \bar{B} = \frac{1}{n} \sum_{i=1:n} B_i,$$

respectively. Each point set may be brought 404 to its origin according to:

$$A_i' = A_i - \bar{A} \quad B_i' = B_i - \bar{B}.$$

A rotation angle, $\theta_{k,k-1}$, may be computed 406 according to:

$$\sin\theta_{k,k-1} = \pm \frac{S}{\sqrt{S^2 + C^2}}$$

and $$\cos\theta_{k,k-1} = \pm \frac{C}{\sqrt{S^2 + C^2}},$$

where $$C = \sum_{i=1:n} A_i' \square B_i'$$

and $$S = \left( \sum_{i=1:n} A_i' \times B_i' \right) \cdot \hat{n},$$

where (•) may denote the dot product, × may denote the cross product and ˆn may denote the normal to the plane in which the rotation lies.

The rotation matrix, $R_{k,k-1}$, may be constructed 408 using the rotation angle, $\theta_{k,k-1}$ according to:

$$R_{k,k-1} = \begin{bmatrix} \cos\theta_{k,k-1} & -\sin\theta_{k,k-1} & 0 \\ \sin\theta_{k,k-1} & \cos\theta_{k,k-1} & 0 \\ 0 & 0 & 1 \end{bmatrix}.$$

The translation, $t_{k,k-1}$, may be computed 410 according to:

$$t_{k,k-1} = \bar{B} - R_{k,k-1} \bar{A}.$$

Figure 5:
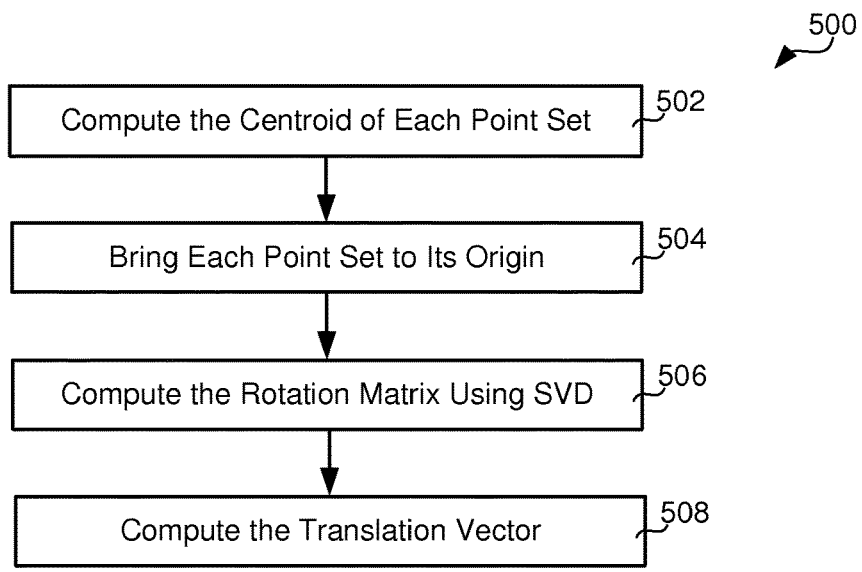
FIG. 5 is a chart showing exemplary embodiments of the present invention comprising Orthogonal-Procrustes-Analysis-based motion estimation.

Alternative embodiments comprising an Orthogonal-Procrustes-Analysis-based method 500 for estimation of the rigid rotation, $R_{k,k-1}$, and the translation, $t_{k,k-1}$, may be described in relation to FIG. 5.

In these exemplary embodiments, a centroid may be computed 502 for each point set A and B according to:

$$\bar{A} = \frac{1}{n} \sum_{i=1:n} A_i \quad \bar{B} = \frac{1}{n} \sum_{i=1:n} B_i,$$

respectively. Each point set may be brought 504 to its origin according to:

$$A_i' = A_i - \bar{A} \quad B_i' = B_i - \bar{B}.$$

The rotation matrix may be computed 506 using singular value decomposition (SVD). First the covariance matrix, which may be denoted H, may be computed according to:

$$H = \sum_{i=1:n} B_i' (A_i')^T.$$

The singular value decomposition of the covariance matrix, H, may be computed, wherein $SVD(H) = U\Sigma V^T$. The rotation matrix, $R_{k,k-1}$, may be computed according to:

$$R_{k,k-1} = V \begin{pmatrix} 1 & 0 & 0 \\ 0 & 1 & 0 \\ 0 & 0 & d \end{pmatrix} U^T,$$

where $$d = \text{sign}(\det(VU^T))$$

and ensures a right-handed coordinate system.

The translation, $t_{k,k-1}$, may be computed 508 according to:

$$t_{k,k-1} = \bar{B} - R_{k,k-1} \bar{A}.$$

In some embodiments of the present invention, motion estimation 130 may comprise outlier rejection to remove outliers caused by, for example, image noise, occlusions, blur, changes in viewpoint, changes in illumination and other causes for which the mathematical model of the feature detector does not account. In some embodiments of the present invention, a RANdom Sample Consensus (RANSAC) iterative motion estimation may be performed. RANSAC computes model hypotheses from randomly sampled sets of data points and then verifies these hypotheses on the other data points. The hypothesis that shows the highest consensus with the other data is selected as the solution. In these embodiments, the estimated model is the relative motion, $R_{k,k-1}$ and $t_{k,k-1}$, between the two camera positions, and the data points are the candidate feature correspondences. In some embodiments of the present invention, motion estimation may be performed according to the following pseudo code:

```
Algorithm: RANSAC motion estimation
Input: 3D feature correspondences (originSet, destinationSet)
bestError, bestInliers ← NULL
for iteration=1:N do
    samples ← randomly pick up k pairs from (originSet, destinationSet)
    compute R and t from samples
    projectedSet ← projectPoints(originSet, destinationSet)
    [meanError, inliers] ← constructInliersSet(projectedSet,
    destinationSet)
    if meanError > T₁ ‖  NumInliers < T₂  ‖ & inliersRatio <    T₃
        continue;
    end if
    if meanError < bestError
            bestError = meanError
            bestInliers = inliers
    end if
end for
if size of bestInliers > 0
    recompute R and t from bestInliers set
    validTransform = true
else
    validTransform = false;
end if
End Algorithm
``` where, in some embodiments, N, the number of iterations is set to 50, k, the number of pairs to sample is set to 3, the error threshold, $T_1$, is in the range of 3-5 mm, the number of inliers threshold is $T_2=5$ and the threshold for the ratio of the inliers is $T_3=0.55$.

The current camera pose may be generated 130 according to:

$$C_k = C_{k-1} T_{k,k-1},$$

where $C_{k-1}$ denotes the camera pose at time k−1. In some embodiments of the present invention, the initial camera pose may be initialized to the identity matrix. The current camera pose comprises the concatenation of all of the transformations, $T_{k,k-1}$(k=1, . . . , n), where n is the current time instant. The current camera pose, $C_k$, has the form $$C_k = \begin{bmatrix} \cos\theta_k & -\sin\theta_k & x_k \\ \sin\theta_k & \cos\theta_k & y_k \\ 0 & 0 & 1 \end{bmatrix},$$

and the motion parameters $[x_k, y_k, \theta_k]$ may be determined 132 from the key pose and stored. The descriptor set from the current image frame may update 134 the descriptor set from the current key frame, and the current frame may become the current key frame. The method 100 may continue by requesting 122 the next incoming frame.

If tracking has been lost, 136, then the motion estimate for the current image frame may be set 138 to the last motion estimate. The current camera post may be generated 140 as described above, and the key pose may be stored 142 to the motion trajectory. The descriptor set from the current image frame may update 144 the descriptor set from the current key frame, and the current frame may become the current frame. The method 100 may continue by requesting 122 the next incoming frame.

Figure 6:
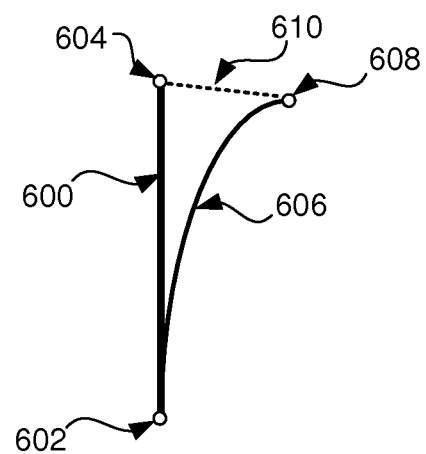
FIG. 6 is a picture illustrating drift introduced in a VO method.

Some embodiments of the present invention may comprise long-range camera-parameter refinement. Assuming a mobile agent drives in a straight line for a predetermined distance, a drift measure may be defined as the distance between an actual endpoint at which the mobile agent arrives and a desired endpoint defined from the initial heading. FIG. 6 depicts a desired path 600 from a starting point 602 to a desired endpoint 604 and an actual path 606 from the starting point 602 to an actual endpoint 608. The drift 610 may be due primarily to an accumulation of angular measurement errors at each step of movement of the mobile agent. The drift, denoted D, may be determined according to:

$$D = \int_0^L \tan(sl) dl,$$

where L denotes the distance travelled and s denotes the angular measurement error per unit of travel distance. Thus, a drift model may be proportional to the second order of traveled distance. Thus, a large drift error may accumulate if a mobile agent travels a long distance.

Figure 7:
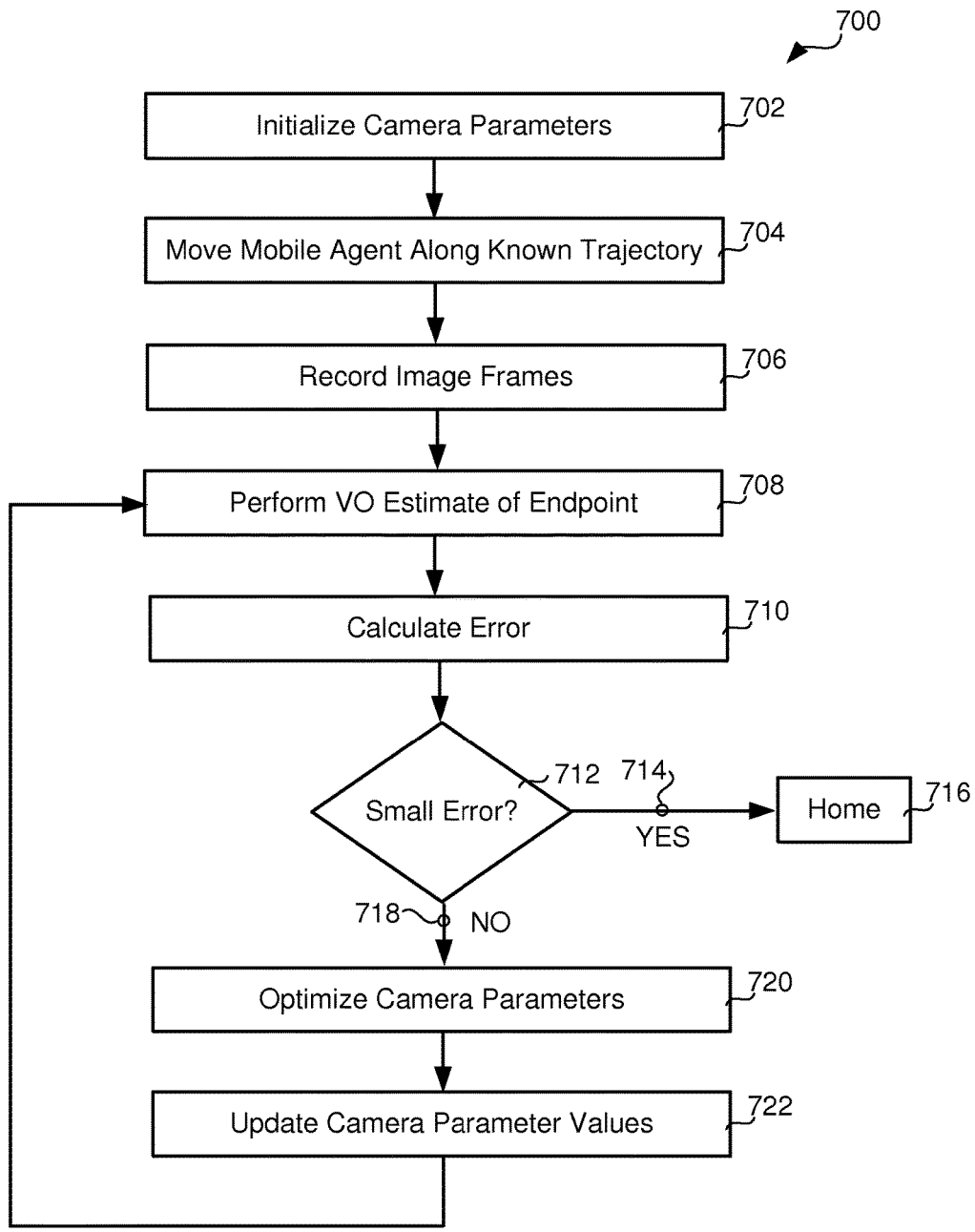
FIG. 7 is a chart showing exemplary embodiments of the present invention comprising driving a mobile agent along a known trajectory to optimize camera parameters.

In some embodiments of the present invention described in relation to FIG. 7, an estimate of true camera parameters may be determined by minimizing the drift accumulated in VO estimation. A method 700 for parameter estimation may comprise initializing 702 camera parameters associated with the mobile-agent camera. In some embodiments of the present invention, the camera parameters may be initialized 702 in accordance with methods described herein. The mobile agent may be moved 704 along a known trajectory from a known, ground truth starting point to a known, ground truth endpoint. In some embodiments of the present invention, the known trajectory may be a straight-line path. In some of these embodiments, the straight-line path may be approximately 10 meters in length. In alternative embodiments, the known trajectory may be of any shape and distance with the constraint that the ground truth may be accurately obtained.

A plurality of image frames may be recorded 706 as the mobile agent moves. The plurality of image frames may be input into a VO module, and a VO method of endpoint estimation may be performed 708. In some embodiments of the present invention, the VO method may be performed 708 according to embodiments of the present invention described herein. An error between the estimated endpoint and the known, ground-truth endpoint may be calculated 710. A determination 712 of whether or not the error is sufficiently small may be made. In some embodiments of the present invention, the determination 712 may comprise comparison of the calculated error with a predetermined threshold. In some embodiments of the present invention, the threshold may be related to the ground-truth length of the known trajectory.

If the error is 714 sufficiently small, then the mobile agent may return 716 to a home position. If the error is not 718 sufficient small, then the camera parameters may be optimized 720. In some embodiments of the present invention, a Levenburg-Marquardt non-linear algorithm may be used to optimize the camera parameters. In alternative embodiments of the present invention, other optimization methods known in the art may be used. The camera parameter values may be updated 722 to the optimized camera parameter values. A VO estimate of the endpoint may be performed 708, and the method may iterate until the error is acceptable. In some embodiments of the present invention (not shown), the method may iterate until the error is acceptable or a time-out condition is met.

Some embodiments of the present invention comprise methods and systems for autonomous mobile-agent navigation based on a plurality of landmarks. The term plurality, as used herein, may refer to one or more. The mobile agent may be equipped with a forward-looking monocular camera, and a landmark, in the plurality of landmarks, may be man-made visual marker, also referred to as a landmark object, with a unique color and/or shape pattern that may be found rarely in a natural scene. In some embodiments of the present invention, a landmark object may be a unique machine-readable code, for example, a bar-code, a QR-code, a Data Matrix code, an Aztec code and other machine-readable codes. A landmark object may be placed at a known geo-referenced position during a site mapping/preparation stage. An ideal landmark object may be visually detected from a long range to provide a beacon for navigation. In some embodiments of the present invention, a detected landmark object may be used to correct VO drift. Additionally, in some embodiments of the present invention, a landmark object may be associated with an identifier that may link to geographic position data and other information about the landmark.

In some embodiments of the present invention, the forward-looking monocular camera may acquire a color image. In alternative embodiments, the forward-looking monocular camera may acquire a gray-scale image, and in yet alternative embodiments, the forward-looking monocular camera may acquire both a color image and a gray-scale image.

In some embodiments of the present invention, a machine-readable code may be embodied on a flat, planar surface. In alternative embodiments of the present invention, a machine-readable code may be embodied on a non-planar surface. In some embodiments of the present invention, information encoded by a machine-readable code may be obtained by scanning the machine-readable code, or an acquired image of the machine-readable code, in a single, predefined direction. In alternative embodiments of the present invention, information encoded by a machine-readable code may be obtained by scanning the machine-readable code, or an acquired image of the machine-readable code, in two, predefined directions. In some of these embodiments, the two, predefined directions may be orthogonal. In yet alternative embodiments of the present invention, information encoded by a machine-readable code may be obtained by performing a de-warping, de-skewing or other perspective-distortion-correction process on an acquired image of the machine-readable code, and scanning the corrected image.

Figure 8:
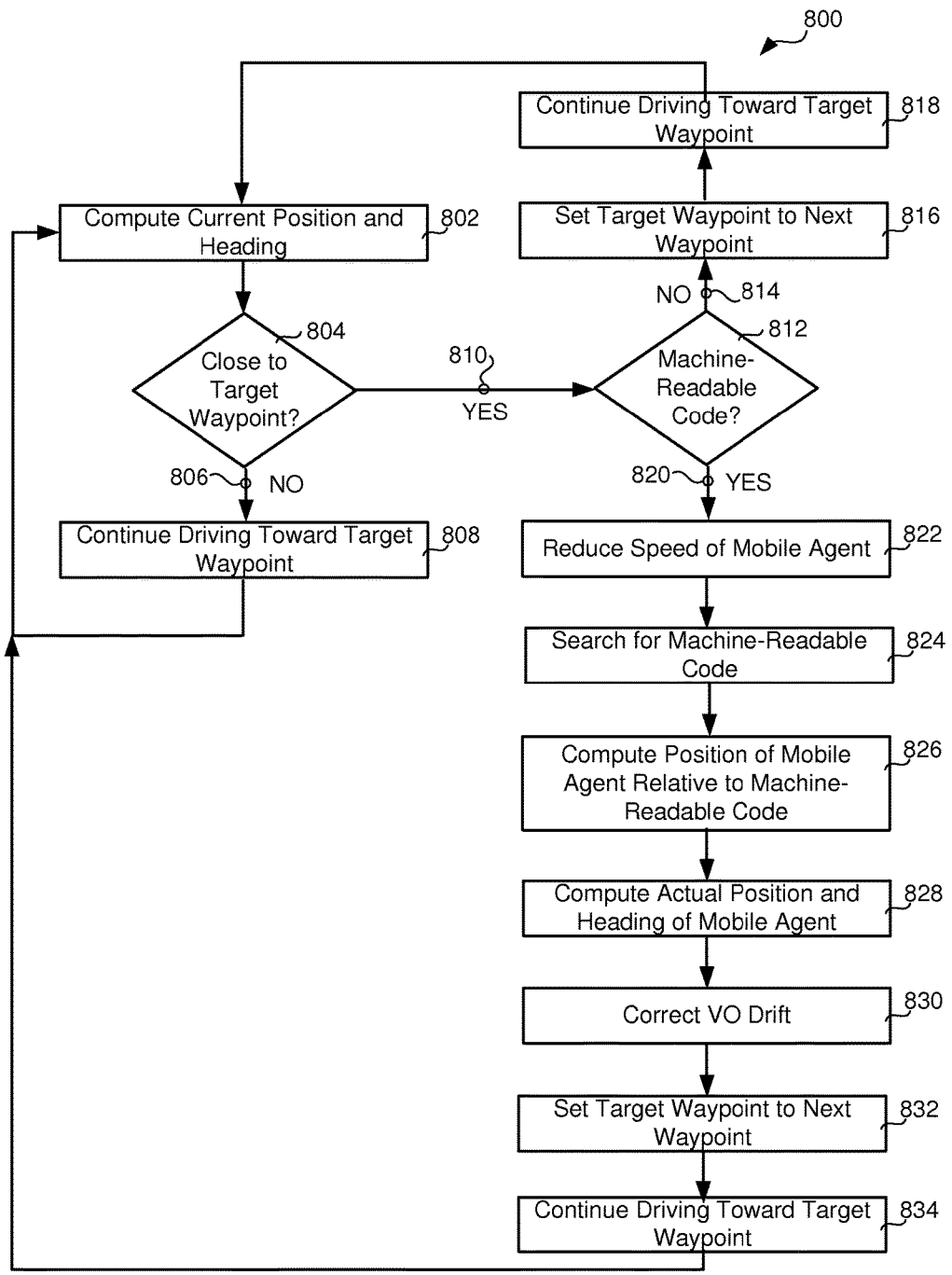
FIG. 8 is a chart showing exemplary embodiments of the present invention comprising determination of the position of a mobile agent relative to a machine-readable code to correct VO drift.

Some embodiments of the present invention, described in relation to FIG. 8, may comprise a method 800 for correcting VO drift. A current position and heading of a mobile agent may be computed 802. A determination 804 may be made to whether or not the mobile agent is close to a target waypoint. If the mobile agent is not 806 close to the target waypoint, then the mobile agent may continue driving toward the target waypoint.

If the mobile agent is 810 close to the target waypoint, then a determination may be made to whether or not the target waypoint is associated with a machine-readable code. If the target waypoint is not 814 associated with a machine-readable code, then the mobile agent may set 816 the target waypoint to the next waypoint on the path, and the mobile agent may continue driving 818 toward the target waypoint.

If the target waypoint is 820 associated with a machine-readable code, then the mobile-agent speed may be reduced 822, and the mobile agent may search 824 for a machine-readable code. When the machine-readable code is identified, the mobile agent may compute 826 its position relative to the machine-readable code.

In some embodiments of the present invention, encoded data stored in the machine-readable code may be extracted. In some embodiments of the present invention, the extracted data may comprise an identifying key. The identifying key, or other extracted data, may be used to retrieve information associated with the machine-readable code. In some embodiments of the present invention, the retrieved information may comprise a plurality of physical attributes of the machine-readable code, for example, for a two-dimensional machine-readable code, a length of a side of the two-dimensional machine-readable code itself, a center point of the two-dimensional machine-readable code and a normal vector to the plane of the two-dimensional machine-readable code.

In some embodiments of the present invention, the retrieved information may comprise physical attributes, of the machine-readable code, that may be used to compute locating points within the machine-readable code. In some embodiments of the present invention, the locating points may comprise the four corners of the machine-readable code. In alternative embodiments of the present invention, the locating points may comprise three non-co-linear points within the machine-readable code. In alternative embodiments, the locating points may comprise a plurality of points, within the machine-readable code, that may be used to unambiguously determine the real-world location of the machine-readable code.

From the retrieved information, a location for each locating point in a plurality of locating points may be computed. All of the stored information and computed information may be in world coordinates and dimensions.

For an exemplary two-dimensional machine-readable code, a vector to a first edge of the two-dimensional machine-readable code, a vector to a second edge of the two-dimensional machine-readable code and four corner points of the two-dimensional machine-readable code may be computed. All of the stored information and computed information may be in three-dimensional world coordinates and dimensions.

The locations, in the received, captured image, of the locating points in the plurality of locating points of the machine-readable code may be determined. For the example of a two-dimensional machine-readable code, the location of the four corner points of the two-dimensional machine-readable code may be determined.

In some embodiments of the present invention, the retrieved information may include the three-dimensional locations of multiple points on the machine-readable code in world coordinates. These points may include corner points, intersection points, center points, key points, or other feature points on the machine-readable code that can be visually identified and located in the image frames captured by the mobile-agent camera.

In some exemplary embodiments of the present invention, a four-capital-letter string, for example, AAAA, AAAB, BBBA and other four letter strings consisting of capital letters, may be used as an identifier key. The identifier key may be embedded within the two-dimensional machine-readable code. In some embodiments of the present invention, multiple two-dimensional machine-readable codes may be associated with one waypoint. In some of these embodiments, two identifiers may be used to identify a waypoint and the associated two-dimensional machine-readable code. In alternative embodiments, a two-level identifier may be used. In yet alternative embodiments, a single identifier comprising two parts may be used. For example, a first portion of the identifier may identify the waypoint, and a second portion of the identifier may identify the two-dimensional machine-readable code.

In some embodiments of the present invention, the first two letters of a four-capital-letter string may identify the waypoint and the last two letters of the four-letter-capital-letter string may identify a two-dimensional machine-readable code associated with the waypoint. Records indexed by the identifying key may be stored in a database. The following records illustrate some exemplary records:

KEY AAAA:
ID: "AAAA"
L: 0.14
x: 0.
y: 0.
z: 0.
a: 1.
b: 0.
c: 0.
KEY AAAB:
ID: "AAAB"
L: 0.14
x: 0.
y: 0.
z: 0.
a: 0.
b: 0.
c: −1.
KEY BBBA:
ID: "BBBA"
L: 0.14
x: 0.
y: 0.
z: 10.
a: 0.
b: 0.
c: −1.
KEY BBBB:
ID: "BBBB"
L: 0.14
x: 0.
y: 0.
z: 10.
a: 1.
b: 0.
c: 0.

In these exemplary records, the information L, x, y, z, a, b and c correspond to a length, L, of a side of a two-dimensional machine-readable code, a center point, (x, y, z), of the two-dimensional machine-readable code and a normal vector, (a, b, c), to the plane of the two-dimensional machine-readable code, respectively. The identifiers "AAAA" and "AAAB" are associated with a first waypoint, and the identifiers "BBBA" and "BBBB" are associated with a second waypoint. In alternative embodiments of the present invention, additional information may be stored in each record.

Using the pairs of coordinates for the locating points, wherein each pair of coordinates comprises a world coordinate and an image coordinate, a rotation matrix and a translation matrix describing the pose of the camera relative to the landmark object associated with the two-dimensional machine-readable code may be computed. In some embodiments of the present invention, a Perspective-n-Point (PnP) algorithm, known in the art, may be used to compute the pose 828 of the camera relative to the object.

In exemplary embodiments comprising a two-dimensional machine-readable code, the pairs of coordinates of the four corner points of the machine-readable code may be used to compute the pose. In alternative embodiments, the pairs of coordinates of three, four, or more locating points on the machine-readable code may be used to compute the pose. In some embodiments of the present invention, a Perspective-n-Point (PnP) algorithm, known in the art, may be used to compute the pose 828 of the camera relative to the machine-readable code.

A correction of the VO drift may be made 830 using the actual position of the mobile agent and the VO-estimated position.

The target waypoint may be set 832 to the next waypoint on the mobile-agent path, and the mobile agent may continue driving 834 toward the target waypoint.

Figure 9:
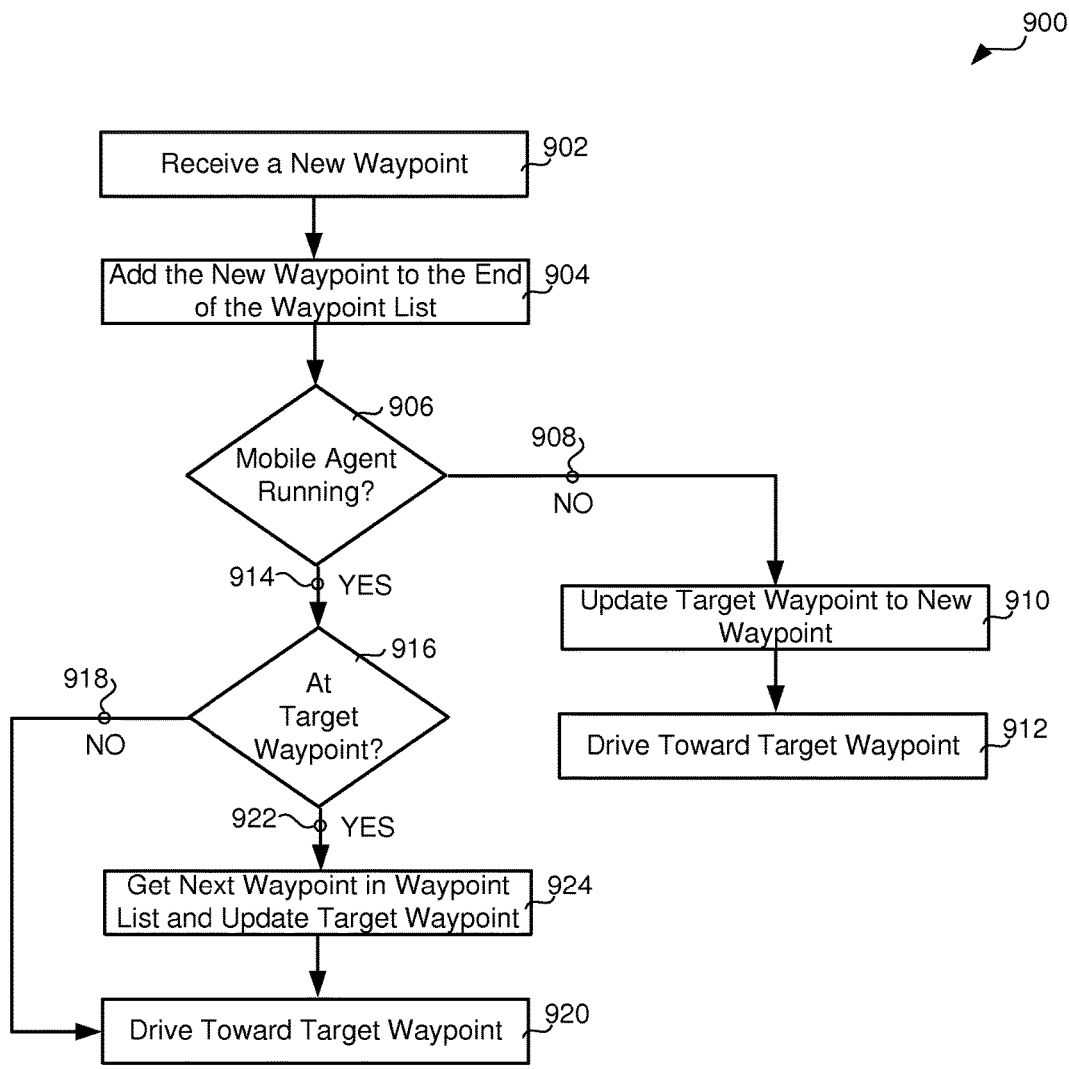
FIG. 9 is a chart showing exemplary embodiments of the present invention comprising addition of a waypoint to a path comprising a plurality of waypoints.

Some embodiments of the present invention described in relation to FIG. 9, may comprise a method 900 for adding a new waypoint to a mobile-agent path while the mobile agent is navigating the path comprising a plurality of waypoints, wherein the waypoints in the plurality of waypoints are ordered based on a waypoint's location in the path, wherein the path traverses between an initial point and a terminal point. A new waypoint may be received 902. The new waypoint may be added 904 to the plurality of waypoints at the terminal end of the ordered waypoints. A determination 906 may be made to whether or not the mobile agent is currently navigating the path. If the mobile agent is stopped 908, then a target waypoint may be updated 910 to the new waypoint, and the mobile agent may commence driving 912 toward the target waypoint.

If the mobile agent is 914 running, then a determination 916 may be made to whether or not the mobile agent is at the target waypoint. If the mobile agent is not 918 at the target waypoint, then the mobile agent may continue driving 920 toward the target waypoint. If the mobile agent is 922 at the target waypoint, then the target waypoint may be updated 924 to the next waypoint in the order waypoints, and the mobile agent may commence driving 920 toward the target waypoint.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for estimating motion, said method comprising:
performing feature detection on a current image frame to identify a plurality of regions in said current image frame, wherein each region in said plurality of regions is associated with a key point in an image coordinate frame;
computing a feature descriptor for each region in said plurality of regions, thereby producing a plurality of feature descriptors for said current image frame;
performing feature matching between said plurality of feature descriptors for said current image frame and a plurality of feature descriptors computed for a key image frame, thereby producing a plurality of feature correspondences; and
when a number of feature correspondences in said plurality of feature correspondences meets a sufficiency criterion:
for each feature correspondence in said plurality of feature correspondences, computing a distance between said corresponding features; and
when said plurality of distances meet a first criterion:
for each feature correspondence in said plurality of feature correspondences, projecting said associated key points from said image coordinate frames to a world coordinate frame, thereby producing a plurality of pairs of world coordinates;
computing a motion estimate from said plurality of pairs of world coordinates;
generating a current camera pose in a global coordinate frame;
determining a motion trajectory from said current camera pose; and
updating said plurality of feature descriptors computed for said key image frame to said plurality of feature descriptors for said current image frame.

2. A method as described in claim 1, wherein said motion estimate comprises a rotation matrix and a translation vector.

3. A method as described in claim 2, wherein said rotation matrix is associated with an in-plane rotation.

4. A method as described in claim 1, wherein said current image frame is received from a camera rigidly mounted on a mobile agent.

5. A method as described in claim 1, wherein said performing feature detection comprises using a feature detector selected from the group consisting of an edge detector, a corner detector, a blob detector, a peak detector, a SIFT key-point detector, a SURF key-point detector, a FAST key-point detector, a grid-based FAST key-point detector, an ORB key-point detector, a MSER key-point detector, a BRIEF key-point detector, a BRISK key-point detector, a FREAK key-point detector and a STAR key-point detector.

6. A method as described in claim 1, wherein said feature descriptor is a feature descriptor selected from the group consisting of a block of pixel values, a block of normalized pixel values, a block of gradient values, a block of adjusted pixel values, a SIFT feature descriptor, a SURF feature descriptor, an ORB feature descriptor, a BRIEF feature descriptor, a BRISK feature descriptor and a FREAK feature descriptor.

7. A method as described in claim 1, wherein said performing feature matching comprises a bitwise comparison of a first feature descriptor and a second feature descriptor.

8. A method as described in claim 1, wherein said performing feature matching comprises pruning a plurality of candidate matches.

9. A method as described in claim 1, wherein said computing a motion estimate comprises using a motion estimator selected from the group consisting of an Orthogonal-Procrustes-Analysis-based motion estimator and an Absolute-Orientation-based motion estimator.

10. A method as described in claim 1, wherein said computing a motion estimate comprises rejecting an outlier in said plurality of feature correspondences.

11. A method as described in claim 10, wherein said rejecting comprises performing RANSAC motion estimation.

12. A method as described in claim 1, wherein said generating a current camera pose comprises concatenating said estimated motion to a previous camera pose.

13. A mobile agent comprising:
a rigidly mounted camera;
a processor component; and
a non-transitory computer-readable medium encoded with a computer program code for causing said processor component to execute a method for estimating motion, said method comprising:
performing feature detection on a current image frame to identify a plurality of regions in said current image frame, wherein each region in said plurality of regions is associated with a key point in an image coordinate frame;
computing a feature descriptor for each region in said plurality of regions, thereby producing a plurality of feature descriptors for said current image frame;
performing feature matching between said plurality of feature descriptors for said current image frame and a plurality of feature descriptors computed for a key image frame, thereby producing a plurality of feature correspondences; and
when there are a sufficient number of feature correspondences in said plurality of feature correspondences:
for each feature correspondence in said plurality of feature correspondences, computing a distancing between said corresponding features; and
when said plurality of distances meet a first criterion:
for each feature correspondence in said plurality of feature correspondences, projecting said associated key points from said image coordinate frames to a world coordinate frame, thereby producing a plurality of pairs of world coordinates;
computing a motion estimate from said plurality of pairs of world coordinates;
generating a current camera pose in a global coordinate frame;
determining a motion trajectory from said current camera pose; and
updating said plurality of feature descriptors computed for said key image frame to said plurality of feature descriptors for said current image frame.

14. A mobile agent as described in claim 13, wherein said camera is rigidly mounted with respect to a ground plane.

15. A mobile agent as described in claim 13, wherein
said camera is mounted on a front end or a back end of said mobile agent and above a body chassis of said mobile agent; and
said when said camera is mounted on said front end of said mobile agent, said camera is tilted to have a field of view of a ground path directly in front of said mobile agent and when said camera is mounted on said back end of said mobile agent, said camera is tilted to have a field of view of said ground path direct behind said mobile agent.

16. A non-transitory computer-readable medium encoded with a computer program code for causing a processor to execute a method for adding a waypoint to an ordered plurality of waypoints, said method comprising:
receiving a new waypoint;
adding said new waypoint to a terminal end of an ordered plurality of waypoints associated with a mobile-agent path;
determining if a mobile agent is running; and
when said mobile agent is not running:
updating a target waypoint to said new waypoint; and
driving toward said target waypoint.

17. A non-transitory computer-readable medium encoded with a computer program code for causing a processor to correct for drift, said method comprising:
computing a current position and a current heading of a mobile agent;
determining if said mobile agent is close to a target waypoint; and
when said mobile agent is determined to be close to said target waypoint:
determining if said target waypoint is associated with a machine-readable code; and
when said target waypoint is determined to be associated with a machine-readable code:
identifying said machine-readable code;
computing a position of said mobile agent relative to said machine-readable code;
determining an actual position and an actual heading of said mobile agent based on said position of said mobile agent relative to said two-dimensional machine-readable code;
updating said current position to said actual position; and
updating said current heading to said actual heading.

18. A non-transitory computer-readable medium as described in claim 17, wherein the machine-readable code is a code selected from the group consisting of a barcode, a QR code, an Aztec code and a Data Matrix code.

19. A non-transitory computer-readable medium encoded with a computer program code for causing a processor to optimize a camera parameter, said method comprising:
receiving a plurality of camera parameter values;
causing a mobile agent to traverse a known path from a known starting point to a known ending point;
recording a plurality of image frames while said mobile agent traverses said known path;
estimating an endpoint of said mobile agent using said plurality of image frames and said plurality of camera parameter values;
computing a difference between said known ending point and said endpoint; and
when said difference meets a first criterion:
optimizing said camera parameters thereby producing a plurality of optimized camera parameter values; and
replacing said plurality of camera parameter values with said plurality of optimized camera parameter values.

20. A non-transitory computer-readable medium as described in claim 19, wherein said known path is a straight line.

\* \* \* \* \*